US 6,745,730 B2

(12) United States Patent
Yamashita (10) Patent No.: US 6,745,730 B2
(45) Date of Patent: Jun. 8, 2004

(54) ODD-CYLINDER V-TYPE INTERNAL COMBUSTION ENGINE (75) Inventor: Noboru Yamashita, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 103 days.

(21) Appl. No.: 10/204,255

(22) PCT Filed: Dec. 13, 2001

(86) PCT No.: PCT/JP01/10925
§ 371 (c)(1),
(2), (4) Date: Aug. 19, 2002

(87) PCT Pub. No.: WO02/055853
PCT Pub. Date: Jul. 18, 2002

(65) Prior Publication Data
US 2003/0075122 A1 Apr. 24, 2003

(30) Foreign Application Priority Data

Jan. 10, 2001 (JP) ........................... 2001-003092
Jan. 11, 2001 (JP) ........................... 2001-003638

(51) Int. Cl.$^7$ .............................................. F02B 75/22
(52) U.S. Cl. ................................... 123/54.5; 123/192.2
(58) Field of Search ............................ 123/54.5, 192.2

(56) References Cited
U.S. PATENT DOCUMENTS 4,519,344 A * 5/1985 Ohyama et al. ........... 123/54.4

FOREIGN PATENT DOCUMENTS

| JP | 59-068523 | 4/1984 |
| JP | 60-065935 | 4/1985 |
| JP | 61-048628 | 3/1986 |
| JP | 08-226493 | 9/1996 |

* cited by examiner

Primary Examiner—Thomas Denion
Assistant Examiner—Zelalem Eshete
(74) Attorney, Agent, or Firm—Carrier, Blackman & Associates, P.C.; Joseph P. Carrier; William D. Blackman (57) ABSTRACT An odd-cylinder V-type internal combustion engine including 2n+1 cylinders (n is a natural number) arranged in two banks and pistons fitted in the cylinders has a crankshaft provided with n common crankpins ($K_C$) each connected to the two paired pistons respectively belonging to the two banks, and one odd crankpin ($K_S$) connected to the one unpaired piston. The common crankpins ($K_C$) are disposed at the same phase. Bank angle θ between the two banks meets $\theta = \cos^{-1}(½n)$. The odd crankpin ($K_S$) is disposed $(180-\theta)°$ behind the common crank pins ($K_C$) with respect to the rotating direction of the crankshaft when the unpaired piston belongs to the front bank with respect to the rotating direction of the crankshaft. Reciprocating parts including all the pistons fitted in the cylinders have the same mass (M), and the crankshaft is provided with balance weight means capable of generating a balancing force of $kMr\omega^2$ acting in a sense of $(\alpha+180)°$, where:

$$k = \sqrt{\left(\frac{1}{2}\sqrt{1-\frac{1}{4n^2}}\right)^2 + \left(n-\frac{1}{4n}\right)^2}$$

$$\alpha = \sin^{-1}\left(\frac{\frac{1}{2}\sqrt{1-\frac{1}{4n^2}}}{k}\right)$$

α: Angle from the common crankpins in the rotating direction
M: Mass of each reciprocating part
r: Crank throw
ω: Angular velocity of the crankshaft The odd-cylinder V-type internal combustion engine prevents generation of a primary vibration caused by a primary inertial force without entailing increase in weight and size.

3 Claims, 7 Drawing Sheets

ODD-CYLINDER V-TYPE INTERNAL COMBUSTION ENGINE

TECHNICAL FIELD

The present invention relates to an odd-cylinder V-type internal combustion engine and, more specifically, to an arrangement for preventing a primary vibration caused by a primary inertial force acting on a reciprocating member, such as a piston.

BACKGROUND ART

A reciprocating internal combustion engine is provided with a balancing mechanism including a balance shaft to prevent vibrations due to unbalanced inertial forces acting on reciprocating members, such as pistons. The balancing mechanism including the balance shaft is driven through a transmission mechanism including a chain and gears by a crankshaft included in the internal combustion engine in synchronism with the rotation of the crankshaft. A balancing mechanism for an odd-cylinder V-type internal combustion engine is disclosed in JP-B 36252/1992. A V-type internal combustion engine mentioned in JP-B 36252/1992 is a five-cylinder internal combustion engine having three front cylinders disposed in a front part of a body frame, and two rear cylinders disposed in a rear part of the body frame. Connecting rods associated with the front cylinders, and those associated with the rear cylinders are connected to the two crankpins of the crankshaft, respectively, and a connecting rod associated with the leftmost cylinder, i.e., the cylinder at the left end of the V-type internal combustion engine as mounted on a motorcycle with respect to the forward traveling direction of the motorcycle, is connected to a crankpin at the left end of the crankshaft. A balancing mechanism is combined with the large end of the connecting rod associated with the leftmost front cylinder to counterbalance an inertial force generated when the internal combustion engine operates. The balancing mechanism includes two arms that perform a pendular motion when the large end turns. The balancing mechanism is held in a case disposed on the left side of the rear cylinders.

This known technique needs the balancing mechanism to counterbalance the inertial force and needs a space to hold the balancing mechanism. Consequently, the size and weight of the internal combustion engine are large, additional parts are necessary, and friction loss increases due to increase in sliding parts.

The present invention has been made in view of such circumstances and it is a first object of the present invention to provide an odd-cylinder V-type internal combustion engine capable of preventing the generation of a primary vibration due to unbalanced primary inertial forces without entailing increase in the weight and size thereof.

A second object of the present invention is to prevent the generation of a primary vibration by using a piston fitted in one of odd cylinders, not paired with any cylinder and to equalize primary inertial forces acting in the rotating direction of a crankshaft for the cylinders.

A third object of the present invention is to provide a simple arrangement capable of preventing a coupling vibration that is generated by primary inertial forces acting as a couple.

SUMMARY OF THE INVENTION

To achieve the first object, according to the present invention, an odd-cylinder V-type internal combustion engine includes 2n+1 cylinders (n is a natural number) arranged in two banks set in a V-shape, pistons fitted in the cylinder bores of the cylinders, connecting rods connected to the pistons, and a crankshaft provided with n common crankpins each connected to the connecting rods connected to two paired ones of the pistons respectively belonging to the two banks, and one odd crankpin connected to the connecting rod connected to the one unpaired piston; wherein the n common crankpins are disposed at the same phase, an angle $\theta$ between the two banks (hereinafter referred to as "bank angle $\theta$") meets: $\theta = \cos^{-1}(\frac{1}{2}n)$, the odd crankpin is disposed $(180-\theta)°$ behind the common crank pins with respect to the rotating direction of the crankshaft when the unpaired piston belongs to the front bank with respect to the rotating direction of the crankshaft or $(180-\theta)°$ ahead of the common crank pins with respect to the rotating direction of the crankshaft when the unpaired piston belongs to the rear bank with respect to the rotating direction of the crankshaft, reciprocating parts including all the pistons fitted in the cylinders, respectively, have the same mass, and the crankshaft is provided with balance weight which generates a balancing force of $kMr\omega^2$ acting in a sense of $(\alpha+180)°$, where:

$$k = \sqrt{\left(\frac{1}{2}\sqrt{1-\frac{1}{4n^2}}\right)^2 + \left(n - \frac{1}{4n}\right)^2}$$

$$\alpha = \sin^{-1}\left(\frac{\frac{1}{2}\sqrt{1-\frac{1}{4n^2}}}{k}\right)$$

α: Angle from the common crankpins in the rotating direction
M: Mass of each reciprocating part
r: Crank throw and
ω: Angular velocity of the crankshaft.

In the odd-cylinder V-type internal combustion engine according to the present invention, in which the bank of the n+1 cylinders and that of n cylinders form the bank angle $\theta$, primary inertial forces acting on the reciprocating parts including the 2n+1 pistons, while the internal combustion engine is in operation are counterbalanced with a balancing force of $kMr\omega^2$ acting in the sense of $(\alpha+180)°$ and, consequently, the generation of a primary vibration attributable to the primary inertial forces can be prevented. Thus, the generation of the primary vibration is prevented by the balance weight incorporated into the crankshaft, so that the balancing mechanism including the arms of the prior art or the balancing mechanism including the transmission mechanism and the balancing shaft is unnecessary, increase in the weight of the internal combustion engine can be suppressed, and the internal combustion engine can be formed in a small size. Reduction in the number of parts improves productivity, reduction in moving parts reduces friction loss because of mechanical friction between the moving parts and, consequently, the effective output of the internal combustion engine can be increased.

According to the present invention, the balance weight may include a plurality of balance weights, attributes of the balance weights may be determined so that the balance ratio for the reciprocating parts including each piston is 50%, and may be disposed diametrically opposite to the corresponding crankpin with respect to the axis of rotation of the crankshaft.

Thus, the unbalanced primary inertial forces acting on all the reciprocating parts including the pistons, connected to the common crankpins are counterbalanced with an unbalanced primary inertial force acting on the reciprocating part including the piston, connected to the odd crankpin to prevent the generation of the primary vibration. The balance weight can be easily incorporated into the internal combustion engine by using the reciprocating part including the piston other than the reciprocating parts including the paired pistons connected to the common crankpins to prevent the generation of the primary vibration. Since the balance weight is determined such that the balance ratio for each reciprocating part including the piston, is 50%, the primary inertial forces of a sense in the rotating direction of the crankshaft can be equalized, the design of bearings supporting the crankshaft is facilitated, increase in weight for rigidity enhancement can be avoided and the internal combustion engine can be formed in lightweight construction.

In the odd-cylinder V-type internal combustion engine according to the present invention, n represents an even number, the balance weight may include a plurality of balance weights, the odd crankpin may be disposed at a position corresponding to a middle part of the crankshaft with respect to directions parallel to the axis of rotation of the crankshaft, the reciprocating parts including all the pistons, and all the balance weights may be arranged symmetrically with respect to an imaginary plane including the center axis of the cylinder bore in which the unpaired piston is fitted and perpendicular to the axis of rotation of the crankshaft.

Thus, the primary inertial forces acting on the crankshaft are counterbalanced with the balancing force generated by the balance weights, the primary inertial force acting on each reciprocating part including, and the balancing force acting on the balance weight are symmetrical with respect to the imaginary plane. Therefore, the primary inertial force and the balancing force do not form a couple, the generation of a coupling vibration because of the primary inertial forces and the balancing force can be prevented by the simple arrangement in which the odd crankpin, the reciprocating parts including the pistons, and the balance weights are disposed symmetrically with respect to the imaginary plane.

DETAILED DESCRIPTION OF THE INVENTION

An odd-cylinder V-type internal combustion engine in a preferred embodiment of the present invention will be described with reference to FIGS. 1 to 9.

Figure 1:
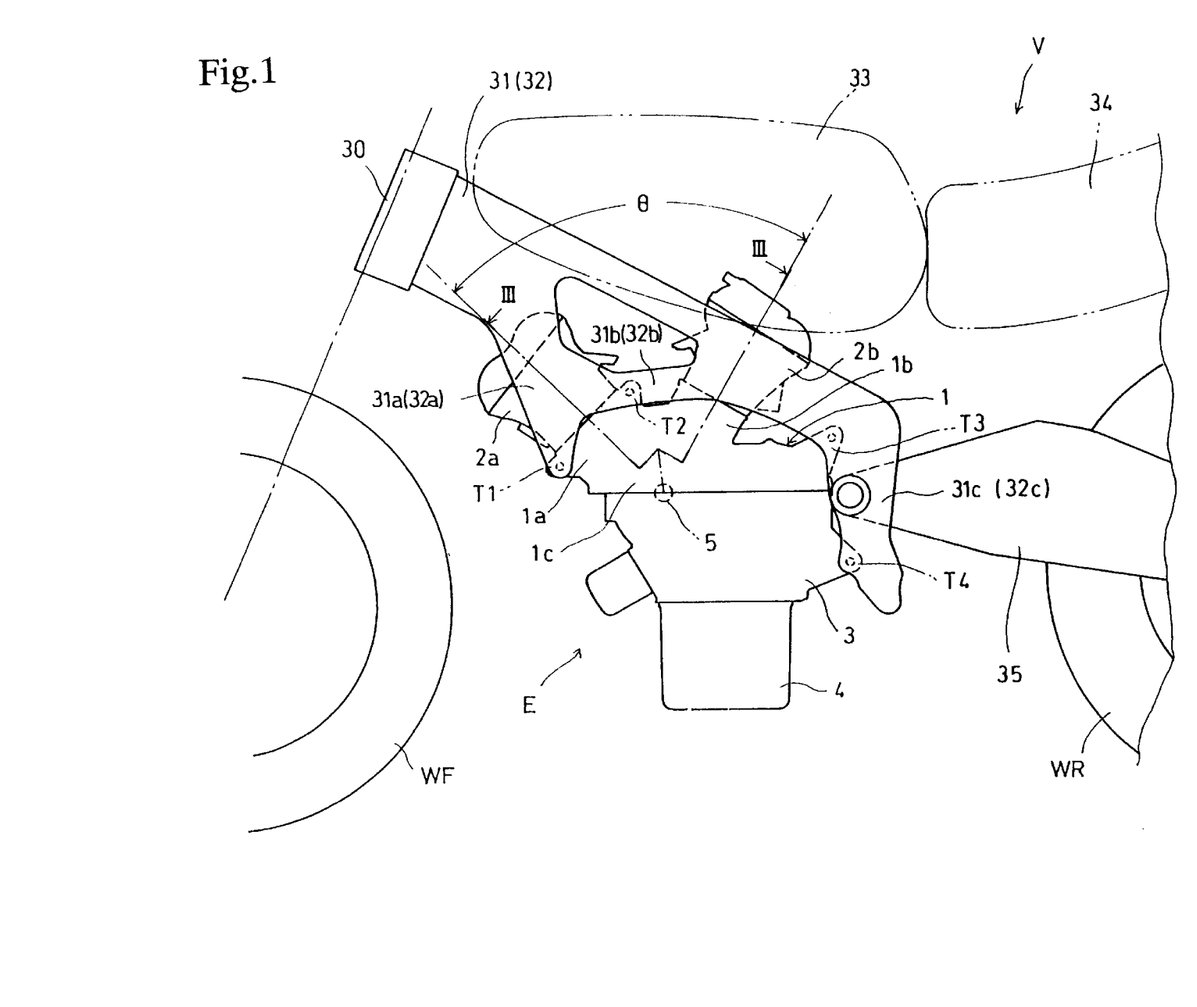
FIG. 1 is a side elevation of an essential part of a motorcycle provided with a V-type internal combustion engine in a preferred embodiment of the present invention as viewed from the left side.

Referring to FIG. 1, a V-type internal combustion engine E (hereinafter, referred to simply as "internal combustion engine E") in a preferred embodiment according to the present invention is a five-cylinder water-cooled four-cycle DOHC V-type internal combustion engine intended to be for use on a motorcycle V. In this description, words "front", "rear", "right", "left" and the like words and phrases are used to designate attributes with respect to the direction of forward travel of the motorcycle V. The internal combustion engine E has a cylinder block 1 having cylinders arranged in a front bank 1a and a rear bank 1b forming a bank angle θ. A lower part of the cylinder block 1 forms an upper crankcase 1c. A front cylinder head 2a and a rear cylinder head 2b are joined to the respective upper end surfaces of the banks 1a and 1b, respectively, of the cylinder block 1. A lower crankcase 3 is joined to the lower end surface of the cylinder block 1, and an oil pan 4 is fastened to the lower end surface of the lower crankcase 3.

Figure 2:
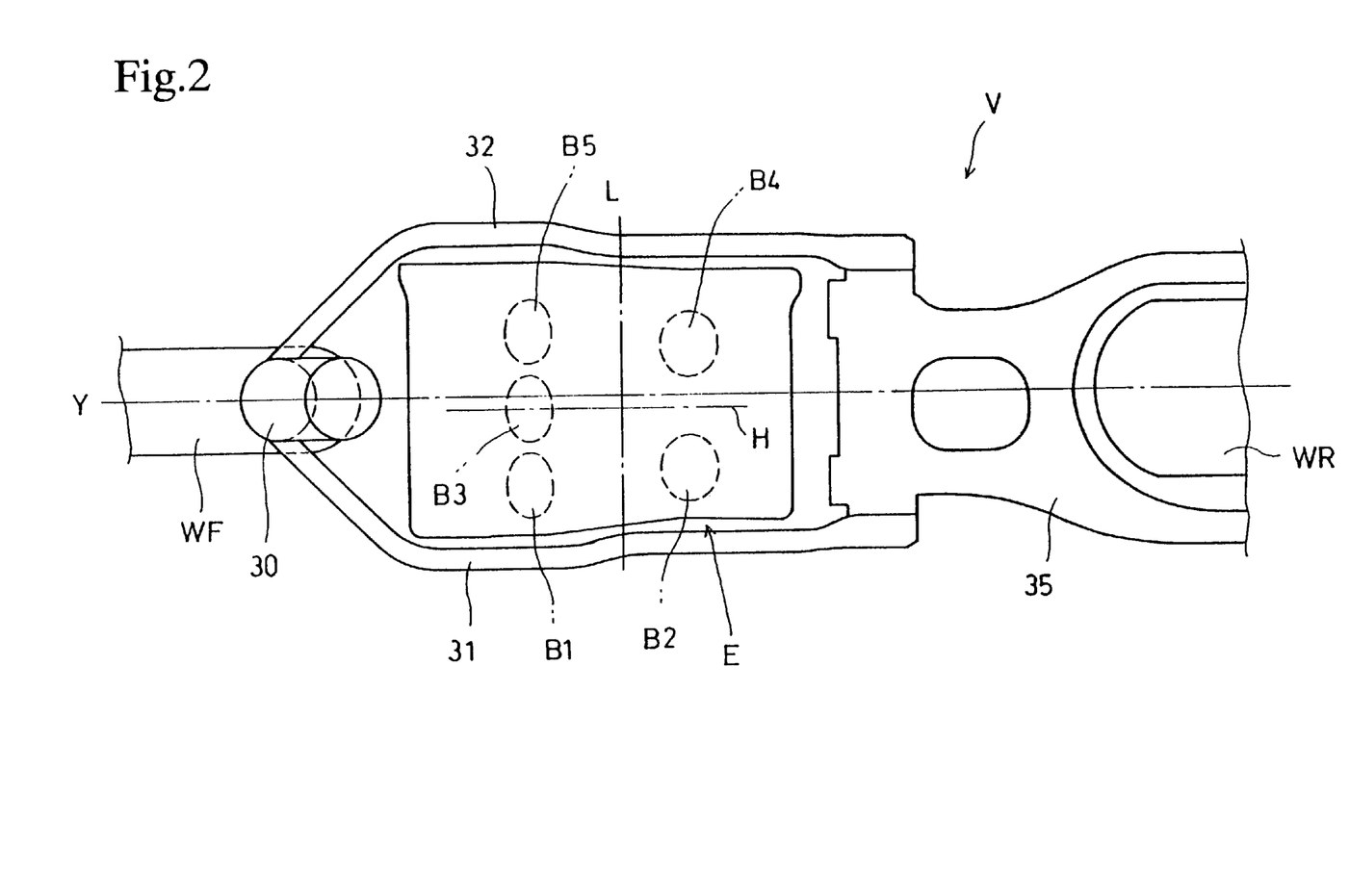
FIG. 2 is a plan view of an essential part of the motorcycle shown in FIG. 1.

Referring to FIGS. 1 and 2, a body frame is provided with a head pipe 30 holding a front suspension holding a front wheel WF, and a pair of main frames 31 and 32 having front ends joined to the head pipe 30 and extending obliquely downward toward the rear. The internal combustion engine E includes a transverse crankshaft 5. The crankshaft 5 is supported for rotation on the cylinder block 1 and the lower crankcase 3 with its axis L of rotation extended in a plane corresponding to the joint of the lower end surface of the cylinder block 1 and the upper end surface of the lower crankcase 3. The crankshaft 5 rotates counterclockwise, as viewed in FIG. 1. Therefore, the front bank 1a is on the leading side with respect to the rotating direction of the crankshaft 5 relative to the rear bank 1b.

Referring to FIGS. 1–2, the internal combustion engine E is disposed at a position under a fuel tank 33, spaced obliquely below toward the front from a seat 34 in a space between the main flames 31 and 32. A pair of front brackets 31a and 32a are extended substantially vertically downward from front parts of the main frames 31 and 32, respectively, and a support part T1 formed integrally with a front part of the front bank 1a is fastened to the front brackets 31a and 32a. Connecting parts 31b and 32b are extended substantially horizontally toward the rear from middle parts of the front brackets 31a and 32a, respectively, and a support part T2 formed integrally with a rear part of the front bank 1a is fastened to the connecting parts 31b and 32b. A pair of rear brackets 31c and 32c are extended substantially vertically downward from rear parts of the main frames 31 and 32, respectively. A support part T3 formed integrally with a rear part of the upper crankcase 1c is fastened to upper parts of the rear brackets 31c and 32c, and a support part T4 formed integrally with a rear part of the lower crankcase 3 is fastened to a lower parts of the rear brackets 31c and 32c. A U-shaped rear fork 35 has a front end part pivotally supported on middle parts of the rear brackets 31c and 32c between the parts to which the support parts T3 and T4 are fastened of the rear brackets 31c and 32c.

Figure 3:
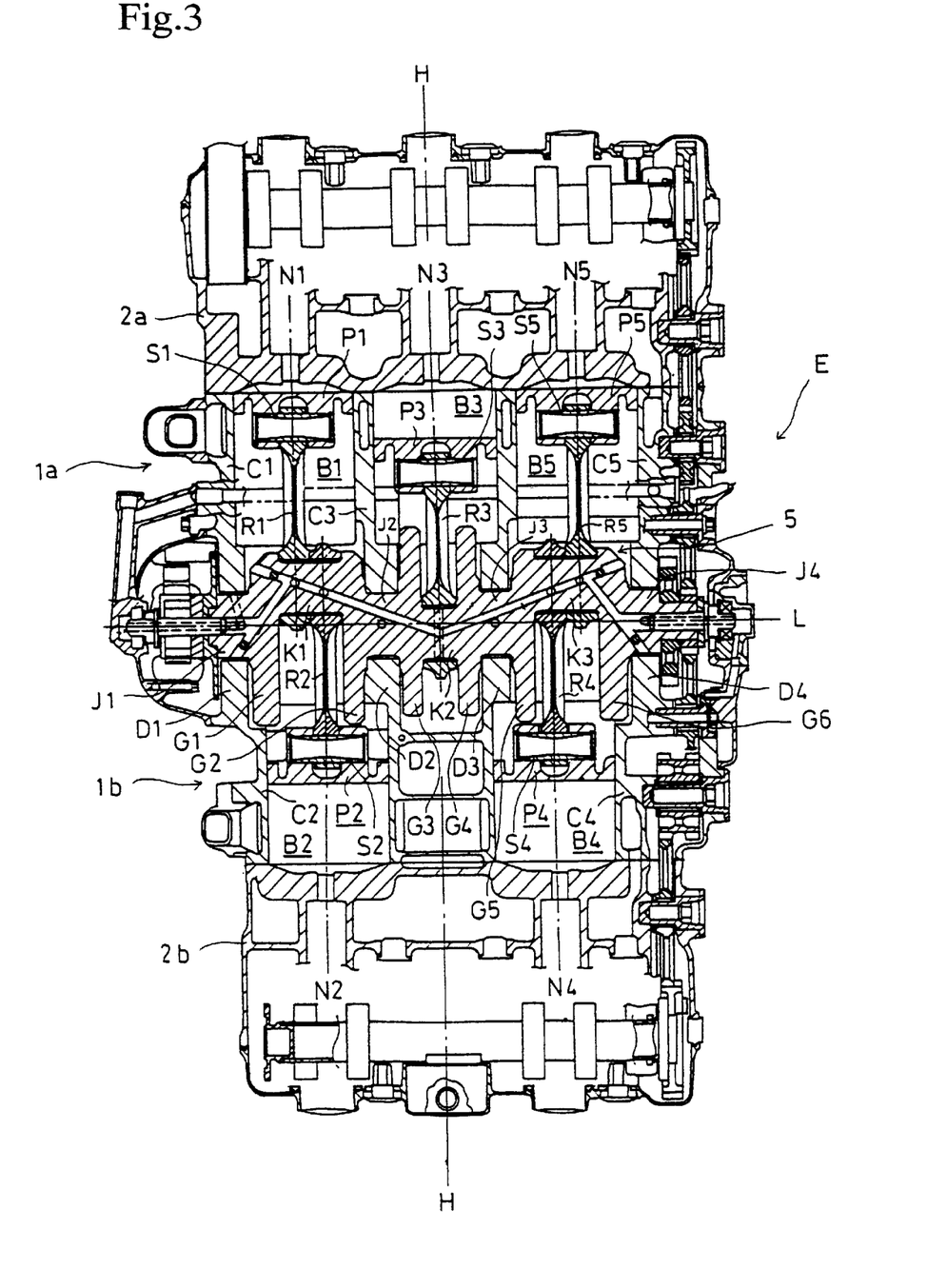
FIG. 3 is a development of a sectional view taken on a line III—III in FIG. 1.

Referring to FIG. 3, three cylinders C1, C3 and C5 respectively provided with cylinder bores B1, B3 and B5 are arranged along the axis L of rotation of the crankshaft 5 in the front bank 1a. The cylinders C1, C3 and C5 are tilted forward with the center axes N1, N3 and N5 of the cylinder bores B1, B3 and B5 extended obliquely upward toward the front. Two cylinders C2 and C4 respectively provided with cylinder bores B2 and B4 are arranged along the axis L of rotation in the rear bank 1b. The cylinders C2 and C4 are tilted rearward with the center axes N2 and N4 of the cylinder bores B2 and B4 extended obliquely upward toward the rear. Pistons P1 to P5 provided with piston rings are fitted for axial sliding in the cylinder bores B1 to B5 of the cylinders C1 to C5, respectively. The pistons P1 to P5 are reciprocated by combustion pressure generated in combustion chambers formed between the pistons P1 to P5 and the corresponding cylinder heads 2a and 2b. The reciprocation of the pistons P1 to P5 is transmitted by connecting rods R1 to R5 respectively connecting the pistons P1 to P5 to the crankshaft 5 to drive the crankshaft 5 for rotation.

The journals J1 to J4 of the crankshaft 5 are supported in main bearings on four bearing parts D1 to D4 formed in the cylinder block 1 and the lower crankcase 3 and arranged at intervals along the axis L of rotation. Two connecting rods R1 and R2 respectively connected to piston pins S1 and S2 respectively attached to the two pistons P1 and P2 fitted in the cylinders C1 and C2 formed in the front bank 1a and the rear bank 1b, respectively, are connected to a crankpin K1 extended between the bearing parts D1 and D2. A connecting rod R3 connected to a piston pin S3 attached to the piston P3 fitted in the cylinder C3 formed in the front bank 1a is connected to a crankpin K2 extended between the bearing parts D2 and D3 and adjacent to the crankpin K1. Two connecting rods R4 and R5 respectively connected to piston pins S4 and S5 respectively attached to the two pistons P4 and P5 fitted in the cylinders C4 and C5 formed in the rear bank 1b and the front bank 1a, respectively, are connected to a crankpin K3 extended between the bearing parts D3 and D4 and adjacent to the crankpin K2. The two crankpins K1 and K3 are common crankpins to which the pair of connecting rods R1 and R2, and the pair of connecting rods R4 and R5 are connected, respectively. The crankpin K2 disposed at a position corresponding to a middle part of the crankshaft 5 between the end journals J1 and J4 of the crankshaft 5 is an odd crankpin to which only the connecting rod R3 connected to the piston P3 is connected.

The common crankpins K1 and K3 are at the same phase; that is, the common crankpins K1 and K3 are coaxial. The connecting rods R1 and R5, and the connecting rods R2 and R4 are connected to the common crankpins K1 and K3, respectively, at positions symmetrical with respect to an imaginary plane H including the center axis N3 of the cylinder bore B3 of the cylinder C3 and perpendicular to the axis L of rotation. All the cylinder bores B1 to B5 are arranged symmetrically with respect to the imaginary plane H. Therefore, reciprocating parts including the pistons P1 to P5, are arranged symmetrically with respect to the imaginary plane H.

In this description, the term "reciprocating parts including the pistons P1 to P5" signifies assemblies of the pistons P1 to P5, accessories of the pistons P1 to P5 that reciprocate together with the pistons P1 to P5, such as the piston rings and piston pins S1 to S5, and reciprocating parts of the connecting rods R1 to R5 connected to the pistons P1 to P5 by the piston pins S1 to S5.

The crankpins K1, K2 and K3 are extended between two crank webs G1 and G2, between two crank webs G3 and G4 and between two crank webs G5 and G6, respectively. The crank webs G1 to G6 are provided with balance weights, respectively. The balance weights are arranged symmetrically with respect to the imaginary plane H so that balancing forces capable of reducing primary inertial forces acting on the reciprocating parts including the pistons P1 to P5 are generated. The four pistons P1, P2, P4 and P5 are provided with balance weights. The balance weights are arranged so that the centers of gravity of the pistons P1, P2, P4 and P5 are at positions diametrically opposite to the odd crankpin K2 with respect to the axis L of rotation on the center axes of the common crankpins K1 and K3, i.e., on an imaginary circle of a radius equal to the crank throw. The piston P3 is provided with a balance weight, which is disposed so that the center of gravity of the piston P3 is at a position diametrically opposite to the odd crankpin K2 on the center axis of the odd crankpin K2, i.e., on an imaginary circle of a radius equal to the crank throw, which is equal to the radius of a circular cylinder including the axes of the common crankpins K1 and K3. The masses of the balance weights are determined so that balance ratios, i.e., the ratios of inertial forces acting on the balance weights to primary inertial forces acting on the reciprocating parts including the pistons P1 to P5 corresponding to the balance weights, are 50%.

Referring to FIG. 2, the rear bank 1b of a width, i.e., size along the axis L of rotation, smaller than that of the front bank 1a is disposed nearer to the seat 34 than the front bank 1a. All the cylinder bores B1 to B5 are arranged symmetrically with respect to the imaginary plane H. Thus, the opposite side ends of the front bank 1a and the rear bank 1b with respect to directions parallel to the axis L of rotation are substantially symmetrical with respect to the center axis Y of the body of the motorcycle V. The three cylinders C1, C3 and C5 of the front bank 1a, and the two cylinders C2 and C4 of the rear bank 1b are substantially symmetrical with respect to the center axis Y, respectively.

The internal combustion engine E is provided with the balance weights that generate balancing forces capable of counterbalancing the primary inertial forces acting on the reciprocating parts including the pistons P1 to P5 that reciprocate while the internal combustion engine E is in operation. The balancing force reduces the unbalancing primary inertial force to 0 (zero) to prevent the generation of a primary vibration. A primary vibration preventing arrangement will be described hereafter.

First, general description will be made of a V-type internal combustion engine provided with 2n+1 (n is a natural number) cylinders arranged in two banks forming a bank angle θ, and then description will be made of a special case for the five-cylinder V-type internal combustion engine E.

The n+1 cylinders of the V-type internal combustion engine provided with the 2n+1 cylinders are arranged along the axis of a crankshaft in a first bank, and the n cylinders are arranged along the axis of rotation of the crankshaft in a second bank. The crankshaft is provided with n common crankpins and one odd crankpin. Two connecting rods connected to pistons fitted in the two paired cylinders respectively belonging to the first and the second bank are connected to each of the n common crankpins. A connecting rod connected to a single piston fitted in the unpaired cylinder of the first bank is connected to the odd crankpin. The n common crankpins are disposed at the same phase with their axes aligned in a line. The odd crankpin may be at any position on the crankshaft with respect to the direction parallel to the axis of rotation of the crankshaft.

Figure 4:
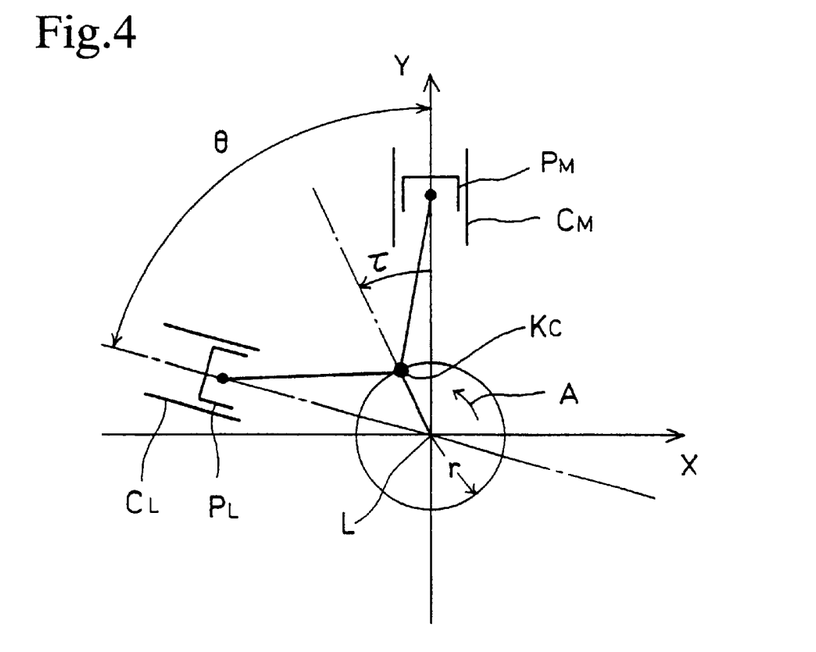
FIG. 4 is a diagrammatic view of assistance in explaining primary inertial forces acting on reciprocating parts including a pair of pistons connected to a common crankpin.

Description will be made of a primary inertial force that is generated by the reciprocation of two pistons $P_L$ and $P_M$ fitted in the two cylinders $C_L$ and $C_M$ respectively belonging to the first and the second bank and connected to the common crankpin $K_C$ with reference to FIG. 4 showing the internal combustion engine in a diagrammatic view taken in the direction parallel to the axis of rotation of the crankshaft. The crankshaft rotates in the direction of the arrow A. In FIG. 4, an origin is on the axis L of rotation. The center axis of the cylinder bore of the cylinder $C_M$ of the second bank is the Y-axis, and an axis perpendicular to the Y-axis is the X-axis. Positive x-values are measured to the right on the X-axis. The center axis of the cylinder bore of the cylinder $C_L$ of the first bank is ahead of the Y-axis by the bank angle $\theta$.

Suppose that:

M: Mass of the reciprocating parts including the piston $\tau$: Crank throw $\omega$: Angular velocity of the crankshaft Then, primary inertial force $F_1$ that acts on the reciprocating parts including the piston $P_L$ of the first bank and primary inertial force $F_2$ that acts on the reciprocating parts including the piston $P_M$ of the second bank are expressed by Expressions (1) and (2), respectively.

$$\begin{bmatrix} F_{1X} \\ F_{1Y} \end{bmatrix} = \begin{bmatrix} -Mr\omega^2 \cos(\tau - \theta)\sin\theta \\ Mr\omega^2 \cos(\tau - \theta)\cos\theta \end{bmatrix} \quad (1)$$

$$\begin{bmatrix} F_{2X} \\ F_{2Y} \end{bmatrix} = \begin{bmatrix} 0 \\ Mr\omega^2 \cos\tau \end{bmatrix} \quad (2)$$

where subscripts X and Y indicate X-axis component and Y-axis component, respectively.

Thus, primary inertial force $F_{12}$ acting on the reciprocating parts including the two pistons $P_L$ and $P_M$ is the vector sum of the primary inertial forces $F_1$ and $F_2$, expressed by expression (3).

$$\begin{bmatrix} F_{12X} \\ F_{12Y} \end{bmatrix} = \begin{bmatrix} F_{1X} \\ F_{1Y} \end{bmatrix} + \begin{bmatrix} F_{2X} \\ F_{2Y} \end{bmatrix} \quad (3)$$

$$= Mr\omega^2 \begin{bmatrix} -\cos(\tau - \theta)\sin\theta \\ \cos\tau + \cos(\tau - \theta)\cos\theta \end{bmatrix}$$

Thus, an inertial force $F_n$ acting on all the reciprocating parts including the pistons connected to the n common crankpins of the V-type internal combustion engine having the 2n+1 cylinders is expressed by Expression (4).

$$\begin{bmatrix} F_{nX} \\ F_{nY} \end{bmatrix} = n \begin{bmatrix} F_{12X} \\ F_{12Y} \end{bmatrix} \quad (4)$$

$$= nMr\omega^2 \begin{bmatrix} -\cos(\tau - \theta)\sin\theta \\ \cos\tau + \cos(\tau - \theta)\cos\theta \end{bmatrix}$$

Figure 5:
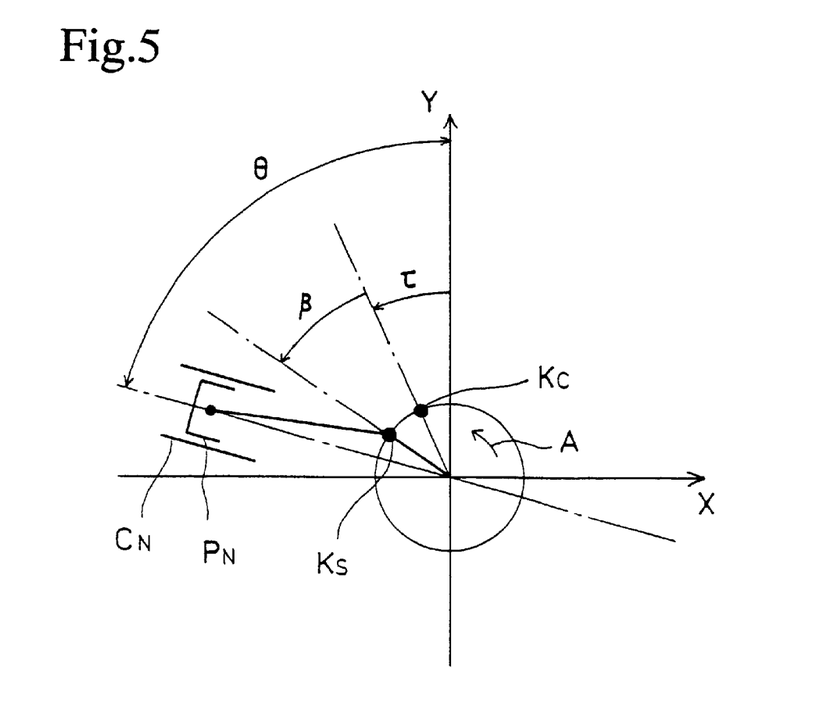
FIG. 5 is a diagrammatic view of assistance in explaining a primary inertial force acting on a reciprocating part including a piston, connected to a crankpin in a bank on a leading side with respect to the rotating direction of a crankshaft.

Primary inertial force $F_C$ that acts on the reciprocating parts including the piston $P_N$ connected to the odd crankpin $K_S$ and fitted in the cylinder $C_N$ of the first bank is determined with reference to FIG. 5. Description will be made on an assumption that the first bank is ahead of the second bank with respect to the rotating direction. Suppose that the phase of the odd crankpin $K_S$ leads the phase of the common crankpins $K_C$ by an angle $\beta$ (degree) in the rotating direction A. Then, the primary inertial force $F_C$ is expressed by expression (5)

$$\begin{bmatrix} F_{CX} \\ F_{CY} \end{bmatrix} = Mr\omega^2 \begin{bmatrix} -\cos(\tau - \theta + \beta)\sin\theta \\ \cos(\tau - \theta + \beta)\cos\theta \end{bmatrix} \quad (5)$$

Therefore, the primary inertial force $F_T$ acting on the V-type internal combustion engine provided with the 2n+1 cylinders is equal to the vector sum of the primary inertial forces $F_n$ and $F_C$.

$$\begin{bmatrix} F_{TX} \\ F_{TY} \end{bmatrix} = \begin{bmatrix} F_{nX} \\ F_{nY} \end{bmatrix} + \begin{bmatrix} F_{CX} \\ F_{CY} \end{bmatrix} \quad (6)$$

$$= Mr\omega^2 \begin{bmatrix} -n\cos(\tau - \theta)\sin\theta - \cos(\tau - \theta + \beta)\sin\theta \\ n\cos\tau + n\cos(\tau - \theta)\cos\theta + \cos(\tau - \theta + \beta)\cos\theta \end{bmatrix}$$

The bank angle $\theta$ is so determined as to meet Expression (7) and the phase of the odd crankpin $K_S$ is so determined as to meet Expression (8); that is, the phase of the odd crankpin $K_S$ lags that of the common crankpins $K_C$ by $(180-\theta)°$ with respect to the rotating direction.

$$\theta = \cos^{-1}(1/(2n)) \quad (7)$$

$$\sin\theta = \sqrt{1 - \cos^2\theta} = \sqrt{1 - \frac{1}{4n^2}} \quad (8)$$

$$\beta = -(180-\theta) \quad (9)$$

In Expression (8), the value of $\sin\theta$ is positive when the bank angle $\theta$ meets an inequality: $0° < \theta < 180°$.

Expression (10) is obtained by rearranging Expression (6) by substituting Expressions (7), (8) and (9) into Expression (6).

$$\begin{bmatrix} F_{TX} \\ F_{TY} \end{bmatrix} = Mr\omega^2 \begin{bmatrix} -n\cos(\tau - \theta)\sin\theta + \cos\tau\sin\theta \\ n\cos\tau + n\cos(\tau - \theta)\cos\theta + \cos\tau\cos\theta \end{bmatrix} \quad (10)$$

$$= Mr\omega^2 \begin{bmatrix} -\left(n - \frac{1}{4n}\right)\sin\tau + \frac{1}{2}\sqrt{1 - \frac{1}{4n^2}}\cos\tau \\ \left(n - \frac{1}{4n}\right)\cos\tau + \frac{1}{2}\sqrt{1 - \frac{1}{4n^2}}\sin\tau \end{bmatrix}$$

where $$k = \sqrt{\left(\frac{1}{2}\sqrt{1 - \frac{1}{4n^2}}\right)^2 + \left(n - \frac{1}{4n}\right)^2} \quad (11)$$

$$\alpha = \sin^{-1}\left(\frac{\frac{1}{2}\sqrt{1 - \frac{1}{4n^2}}}{k}\right) \quad (12)$$

$$\sin\alpha = \frac{\frac{1}{2}\sqrt{1 - \frac{1}{4n^2}}}{k} \quad (13)$$

$$\cos\alpha = \frac{n - \frac{1}{4n}}{k} \quad (14)$$

Thus, Expression (15) is obtained by rearranging Expression (10) taking into consideration Expressions (13) and (14).

$$\begin{bmatrix} F_{TX} \\ F_{TY} \end{bmatrix} = kMr\omega^2 \begin{bmatrix} -\sin(\tau - \alpha) \\ \cos(\tau - \alpha) \end{bmatrix} \quad (15)$$

Figure 6:
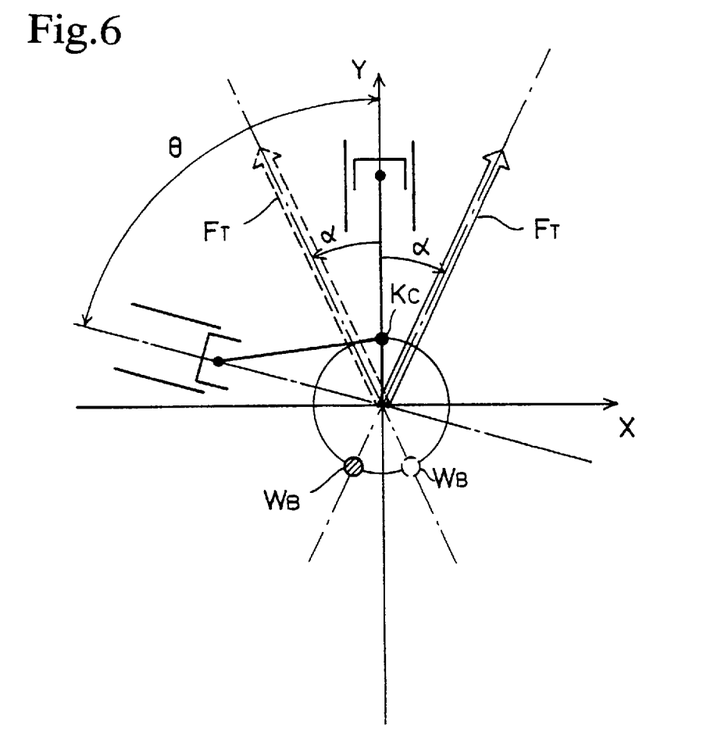
FIG. 6 is a diagrammatic view of a primary inertial force acting on the internal combustion engine.

It is known from Expression (15) that the magnitude of the primary inertial force $F_T$ equal to the vector sum of the primary inertial forces acting on the reciprocating parts including the pistons of the V-type internal combustion engine is equal to $kMr\omega^2$, and the vector representing the primary inertial force $F_T$ lags the angle $\tau$ of rotation of the crankshaft by an angle $\alpha$ and turns at an angular velocity equal to that at which the crankshaft rotates. Therefore, the unbalancing primary inertial force acting on the V-type internal combustion engine can be always reduced to 0 (zero) if balance weights capable of generating balancing force capable of counterbalancing the primary inertial force $F_T$ are incorporated into the crankshaft. Therefore, as shown in FIG. 6 illustrating a state where the common crankpins $K_C$ are on the Y-axis, a balance weight $W_B$ is disposed at an angular position of $(\alpha+180)°$ with respect to the primary inertial force $F_T$ indicated by a blank arrow. The balance weight $W_B$ has, for example, a mass $kM$ and the center of gravity on the radius of the crankshaft.

Figure 7:
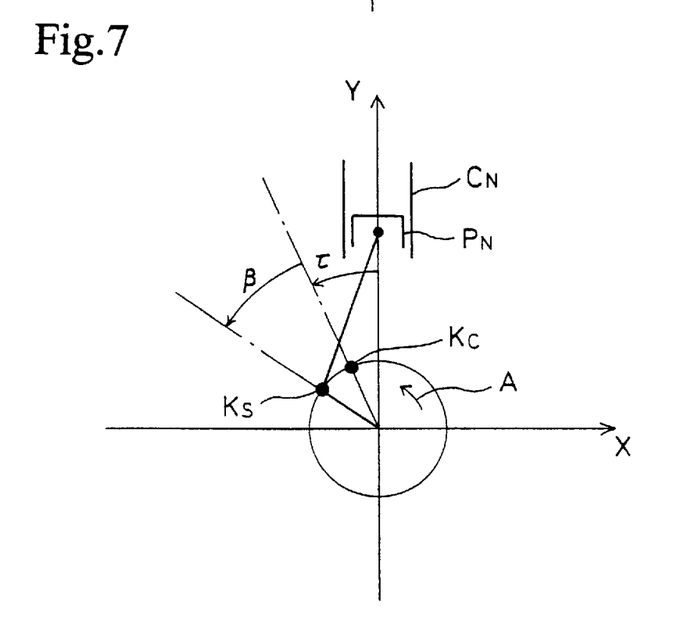
FIG. 7 is a diagrammatic view of assistance in explaining a primary inertial force acting on a reciprocating part including a piston, connected to a crankpin in a bank on a lagging side with respect to the rotating direction of a crankshaft.

If the first bank is behind the second bank with respect to the rotating direction, a primary inertial force $F_C$ that acts on the reciprocating parts including the unpaired piston $P_N$ is expressed by Expression (16) corresponding to Expression (5) when the phase of the odd crankpin $K_S$ leads that of the common crankpins $K_C$ in the rotating direction A by an angle $\beta$.

$$\begin{bmatrix} F_{CX} \\ F_{CY} \end{bmatrix} = Mr\omega^2 \begin{bmatrix} 0 \\ \cos(\tau + \beta) \end{bmatrix} \quad (16)$$

Thus, the primary inertial force $F_T$ acting on the V-type internal combustion engine is equal to the vector sum of the primary inertial forces $F_n$ and $F_C$ as expressed by Expression (17)

$$\begin{bmatrix} F_{TX} \\ F_{TY} \end{bmatrix} = \begin{bmatrix} F_{nX} \\ F_{nY} \end{bmatrix} + \begin{bmatrix} F_{CX} \\ F_{CY} \end{bmatrix} \quad (17)$$

$$= Mr\omega^2 \begin{bmatrix} -n\cos(\tau - \theta)\sin\theta \\ n\cos\tau + n\cos(\tau - \theta)\cos\theta + \cos(\tau + \beta) \end{bmatrix}$$

The bank angle $\theta$ is so determined as to meet Expression (7), the phase of the odd crankpin $K_S$ is so determined as to meet Expression (18); that is the phase of the odd crankpin $K_S$ leads that of the common crankpins $K_C$ by an angle $(180-\theta)°$.

$$\beta = (180-\theta) \quad (18)$$

Expression (19) is obtained by substituting Expressions (7), (8) and (18) into Expression (17) and rearranging Expression (17).

$$\begin{bmatrix} F_{TX} \\ F_{TY} \end{bmatrix} = Mr\omega^2 \begin{bmatrix} -\left(n - \frac{1}{4n}\right)\sin\tau - \frac{1}{2}\sqrt{1 - \frac{1}{4n^2}}\cos\tau \\ \left(n - \frac{1}{4n}\right)\cos\tau - \frac{1}{2}\sqrt{1 - \frac{1}{4n^2}}\sin\tau \end{bmatrix} \quad (19)$$

Expression (20) corresponding to Expression (15) is obtained by substituting Expressions (13) and (14) into Expression (19).

$$\begin{bmatrix} F_{TX} \\ F_{TY} \end{bmatrix} = Mr\omega^2 \begin{bmatrix} -\sin(\tau + \alpha) \\ \cos(\tau + \alpha) \end{bmatrix} \quad (20)$$

It is known from Expression (20) that the magnitude of the primary inertial force $F_T$ is equal to $kMr\omega^2$, and the vector representing the primary inertial force $F_T$ leads the angle $\tau$ of rotation of the crankshaft by an angle $\alpha$ and turns at an angular velocity equal to that at which the crankshaft rotates when the first bank including the unpaired cylinder is behind the second bank with respect to the rotating direction. Therefore, the unbalancing primary inertial force acting on the V-type internal combustion engine can be always reduced to 0 (zero) when the balance weight $W_B$ that generates a balancing force capable of counterbalancing the primary inertial force $F_T$ is incorporated into the crankshaft. Therefore, as shown in FIG. 6 illustrating a state where the common crankpins $K_C$ are on the Y-axis, the balance weight $W_B$ is disposed at an angular position of $(\alpha+180)°$ with respect to the primary inertial force $F_T$ indicated by a blank arrow indicated by broken lines. The balance weight $W_B$ has, for example, a mass $kM$ and the center of gravity on an imaginary circle of a radius equal to the crank throw.

Description will be made of a special primary vibration preventing arrangement for the foregoing five-cylinder V-type internal combustion engine E provided with $2n+1$ ($n=2$) cylinders.

In a V-type internal combustion engine having $2n+1$ cylinders, a balance weight may be disposed at any part of the crankshaft, provided that Expression (15) or (20) is satisfied. In the internal combustion engine E, the masses of the balance weights are determined so that balance ratios, i.e., the ratios of inertial forces acting on the balance weights to primary inertial forces acting on the reciprocating parts including the pistons P1 to P5, are 50%, which is equivalent to disposing balance weights having a mass of $M/2$ on an imaginary circle of a radius equal to the crank throw for the reciprocating parts including the pistons P1 to P5.

Figure 8A:
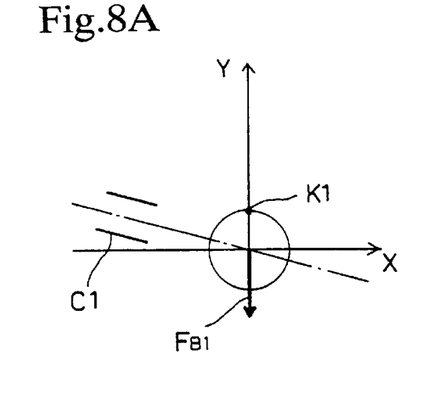
FIGS. 8A, 8B, 8C, 8D, 8E and 8F are diagrammatic views of assistance in explaining a balancing force acting on a balance weight included in the V-type internal combustion engine shown in FIG. 1.
Figure 8B:
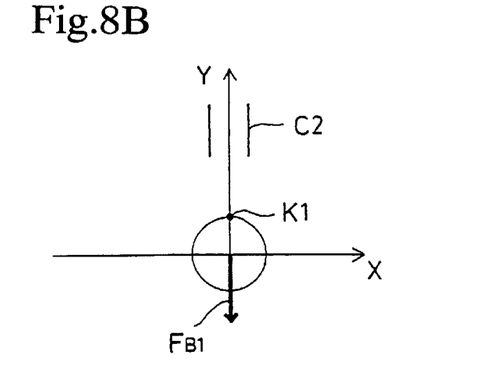
Figure 8C:
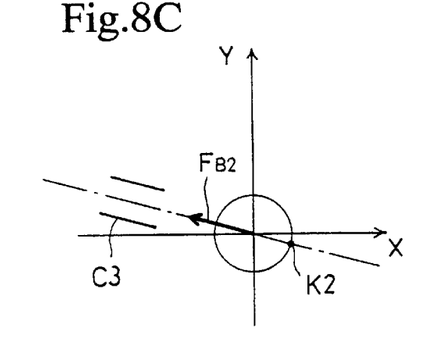
Figure 8D:
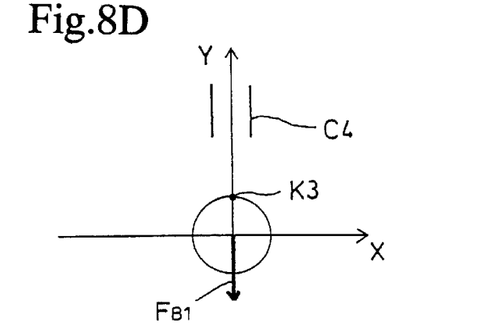
Figure 8E:
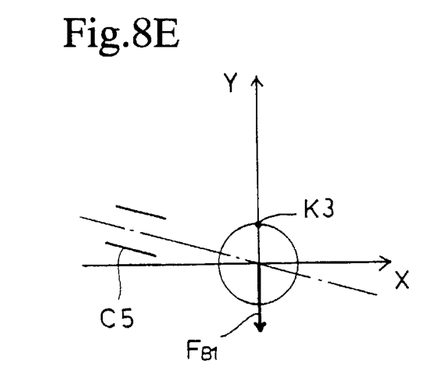
Figure 8F:
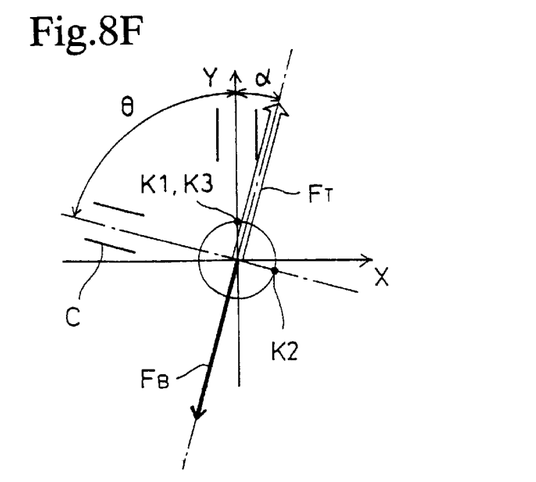

FIGS. 8A to 8E illustrate states where the common crankpins K1 and K3 are on the Y-axis to facilitate understanding the description. Balance weights are incorporated into the crankshaft such that the balance weights generate balancing forces $F_{B1}$ and $F_{B2}$. A balancing force $F_B$ that acts on the internal combustion engine E is the vector sum of the balancing forces $F_{B1}$ and $F_{B2}$. As shown in FIG. 8F, the balancing force $F_B$ has a magnitude equal to the primary inertial force $F_T$ obtained by substituting 2 for n of Expression (15) and a sense opposite to that of the primary inertial force $F_T$. Thus, the resultant force of those forces is 0 (zero) and hence the generation of vibrations by the primary inertial force can be prevented.

This fact indicates that an unbalanced primary inertial force remaining after the addition of the primary inertial forces acting on the reciprocating parts including the four pistons P1, P2, P4 and P5 connected to the common crankpins K1 and K3 and the balancing forces generated by the balance weights for counterbalancing the reciprocating parts including the pistons P1, P2, P4 and P5 is counterbalanced with an unbalanced primary inertial force remaining after the addition of the primary inertial force acting on the reciprocating parts including the piston P3 connected to the odd crankpin K2 and the balancing force of the balance weight for counterbalancing the reciprocating parts including the piston P3, and hence the unbalanced primary inertial force acting on the internal combustion engine E is 0 (zero).

Figure 9:
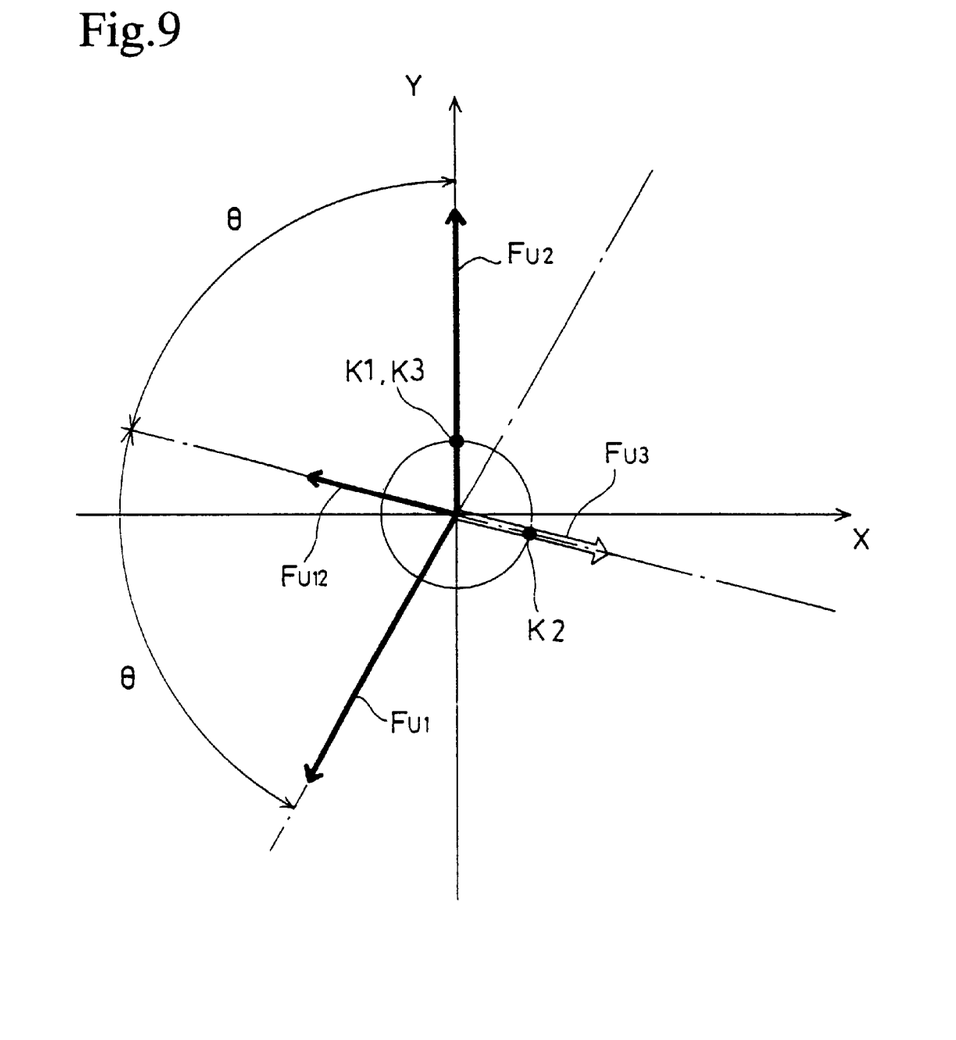
FIG. 9 is a diagrammatic view of assistance in explaining an unbalancing primary inertial force acting on the V-type internal combustion engine shown in FIG. 1.

Referring to FIG. 9 illustrating a state where the common crankpins K1 and K3 are on the Y-axis to facilitate understanding the description, primary inertial forces acting respectively on the reciprocating parts including the pistons P1 and P5 fitted in the cylinders C1 and C5 of the front bank 1a are equal to each other and are calculated by using Expression (1). The resultant force of those forces is $2Mr\omega^2 \cos\theta$ and acts in a sense at an angle $\theta$ to the positive direction of the Y-axis. Balancing force generated by balance weights for balancing the reciprocating parts including the pistons P1 and P5 is $2Mr\omega^2/2$ and acts in a sense at an angle of 180° to the positive direction of the Y-axis. Thus, an unbalanced primary inertial force $F_{U1}$ acting on the reciprocating parts including the pistons P1 and P5 is equal to the vector sum of the primary inertial force and the balancing force of $2Mr\omega^2/2$ and acts in a sense at an angle of $2\theta$ to the positive direction of the Y-axis.

Primary inertial forces acting respectively on the reciprocating parts including the pistons P2 and P4 fitted in the cylinders C2 and C4 of the rear bank 1b are equal to each other and are calculated by using Expression (2). The resultant force of those forces is $2Mr\omega^2$ and acts in the positive direction of the Y-axis. Balancing forces generated by balance weights for balancing the reciprocating parts including the pistons P2 and P4 is $2Mr\omega^2/2$ and acts in a sense at an angle of 180° to the positive direction of the Y-axis. Thus, an unbalanced primary inertial force $F_{U2}$ acting on the reciprocating parts including the pistons P2 and P4 is equal to the vector sum of the primary inertial force and the balancing force and acts in a sense parallel the positive direction of the Y-axis.

Consequently, an unbalanced primary inertial force $F_{U12}$ acting on the reciprocating parts including the pistons P1, P2, P4 and P5 connected to the two common crankpins K1 and K3 is the vector sum of the unbalanced primary inertial forces $F_{U1}$ and $F_{U2}$ and is equal to $2Mr\omega^2 \cos\theta$ and acts in a sense at an angle $\theta$ to the positive direction of the Y-axis. It is known from Expression (7) that the magnitude of the unbalanced primary inertial force $F_{U12}$ is $Mr\omega^2/2$.

A primary inertial force acting on the reciprocating parts including the unpaired piston P3 fitted in the cylinder C3 of the front bank 1a and connected to the odd crankpin K2 is calculated by using Expression (5). This primary inertial force has a magnitude of $Mr\omega^2$ and acts in a sense at an angle of $-(180-\theta)°$ to the positive direction of the Y-axis. A balancing force generated by the balance weight for balancing the reciprocating parts including the unpaired piston P3 has a magnitude of $Mr\omega^2/2$ and acts in a sense at an angle of $\theta$ to the Y-axis. Therefore, an unbalanced primary inertial force $F_{U3}$ acting on the reciprocating parts including the unpaired piston P3 is the vector sum of the primary inertial force and the balancing force. This unbalanced primary inertial force $F_{U3}$ is $Mr\omega^2/2$ and acts in a sense at an angle of $-(180-\theta)°$ to the positive direction of the Y-axis.

Thus, it is known that the unbalanced primary inertial force $F_{U12}$ acting on the reciprocating parts including the four pistons P1, P2, P4 and P5 connected to the common crankpins K1 and K3 is counterbalanced with the unbalanced primary inertial force $F_{U3}$ acting on the reciprocating parts including the unpaired piston P3 connected to the odd crankpin K2 and hence the unbalanced primary inertial force acting on the internal combustion engine E is reduced to 0 (zero), which is true of the V-type internal combustion engine having 2n+1 cylinders and provided with balance weights that makes the balance ratio of the reciprocating parts including each piston 50%.

The operation and effect of the internal combustion engine thus constituted according to the present invention will be described hereinafter.

When the internal combustion engine E having the front bank 1a of the three cylinders C1, C3 and C5, and the rear bank 1b of the two cylinders C2 and C4 forming the bank angle $\theta$ operates, the primary inertial force acting on all the reciprocating parts including the pistons P1 to P5 is counterbalanced with the balancing force generated by the balance weights incorporated into the crankshaft 5 because the balance weights are incorporated into the crankshaft so that the balancing force has a magnitude of $kMr\omega^2$ and acts in a sense in the direction of the angle $(\alpha+180)°$ ($k=(15/4)^{1/2}$ and $\alpha=-\sin^{-1}(1/4)$) as illustrated in FIG. 8F. Consequently, the balance weights incorporated into the crankshaft 5 prevents the generation of the primary vibration. Thus, the balancing mechanism including the arms of the prior art or the balancing mechanism including the transmission mechanism and the balancing shaft is unnecessary, increase in the weight of the internal combustion engine can be suppressed, and the internal combustion engine can be formed in a small size. Reduction in the number of parts improves productivity, reduction in moving parts reduces friction loss because of mechanical friction between the moving parts and, consequently, the effective output of the internal combustion engine can be increased.

Since the mass and positions of the balance weights are determined so that the balance ratios for the reciprocating parts including the pistons P1 to P5 are 50%, and are disposed diametrically opposite to the crankpins with respect to the axis L of rotation, the unbalanced primary inertial force $F_{U12}$ acting on all the reciprocating parts including the pistons P1, P2, P4 and P5 connected to the common crankpins K1 and K3 is counterbalanced with the unbalanced primary inertial force $F_{U3}$ acting on the reciprocating parts including the piston P3 connected to the odd crankpin K2 and, consequently, the generation of the primary vibration can be prevented. Therefore, generation of the primary vibration can be prevented by an arrangement facilitating the combination of the balance weights with the crankshaft by using the reciprocating parts including the unpaired piston P3 connected to the odd crankpin K2 other than the reciprocating parts including the paired pistons P1, P2, P4 and P5 connected to the common crankpins K1 and K3. Since the masses of the balance weights are determined so that balance ratios, i.e., the ratios of inertial forces acting on the balance weights to primary inertial forces acting on the reciprocating parts including the pistons P1 to P5, are 50%, the primary inertial force acting in the rotating direction of the crankshaft 5 is equalized. Consequently, work for designing the bearing parts D1 to D4 is facilitated, increase in weight to enhance rigidity can be avoided and the internal combustion engine can be formed in lightweight construction. If the crankshaft 5 is a built-up crankshaft, the component parts including the crank webs G1 to G6 may be common parts and hence the crankshaft 5 can be manufactured at a low cost.

Since the odd crankpin K2 is disposed at a position corresponding to a middle part of the crankshaft 5 with respect to the axis L of rotation of the crankshaft 5, and all the reciprocating parts including the pistons P1 to P5 and all the balance weights are disposed symmetrically with respect to the imaginary plane H, the primary inertial force acting on the crankshaft 5 is counterbalanced with the balancing force generated by the balance weights, the primary inertial forces acting o the reciprocating parts including the pistons P1 to P5 and the balancing force generated by the balance weights are symmetrical with respect to the imaginary plane H, and the primary inertial force and the balancing force do not form a couple. Consequently, generation of a coupling vibration because of the primary inertial forces and the balancing force can be prevented by the simple arrangement in which the reciprocating parts including the crankpins K1 to K3 and the pistons P1 to P5, and the balancing weights are disposed symmetrically with respect to the imaginary plane H.

Since the rear bank 1b of a width smaller than that of the front bank 1a is nearer to the seat 34 when the internal combustion engine E is mounted on the motorcycle V, the driver is able to stabilize riding position easily by holding the fuel tank 33 between the legs by a knee-grip riding method. Since the two cylinders C2 and C4 of the rear bank 1b, as well as those of the front bank 1a, are arranged substantially symmetrically with respect to the center axis Y of the body of the motorcycle V, the weight of the internal combustion engine E is distributed equally to the right and the left side of the body. Since the center of gravity of the internal combustion engine E is near the center axis Y of the body, the maneuverability and stability of running are improved. Since all the cylinder bores B1 to B5 are arranged symmetrically with respect to the imaginary plane H, the opposite side ends of the front bank 1a and the rear bank 1b with respect to directions parallel to the axis L of rotation are substantially symmetrical with respect to the center axis Y of the body of the motorcycle V, which facilitates mounting the internal combustion engine E on the body frame.

When the unpaired piston P3 connected to the odd crankpin K2 is fitted in the cylinder of the rear bank 1b of the five-cylinder V-type internal combustion engine E, generation of a primary vibration not only in the five-cylinder V-type internal combustion engine but also in the (2n+1)-cylinder V-type internal combustion engine can be prevented.

In an odd-cylinder V-type internal combustion engine in a modification, where n is one of even numbers excluding 2, generation of a coupling vibration can be prevented, provided that the reciprocating parts including all the pistons and all the balance weights are arranged symmetrically with respect to an imaginary plane including the center axis of the cylinder bore of the cylinder in which an unpaired piston connected to an odd crankpin disposed at a position corresponding to a middle part of the crankshaft between the opposite end journals of the crankshaft with respect to directions along the axis L of rotation of the crankshaft, and perpendicular to the axis L of rotation.

The present invention is applicable to internal combustion engines other than automotive internal combustion engines.

Although there have been described what are the present embodiments of the invention, it will be understood by persons skilled in the art that variations and modifications may be made thereto without departing from the gist, spirit or essence of the invention. The scope of the invention is indicated by the appended claims.

What is claimed is:

1. An odd-cylinder V-type internal combustion engine comprising:
2n+1 cylinders (n is a natural number) arranged in two banks formed in a V-shape, pistons fitted in cylinder bores of the cylinders, connecting rods connected to the pistons, and a crankshaft provided with n common crankpins each connected to the connecting rods connected to two paired ones of the pistons respectively belonging to the two banks, and one odd crankpin connected to the connecting rod connected to the one unpaired piston;

wherein the n common crankpins are disposed at the same phase, a bank angle θ between the two banks meets:

$$\theta = \cos^{-1}(\tfrac{1}{2}n),$$

the odd crankpin is disposed (180−θ)° behind the common crankpins with respect to a rotating direction of the crankshaft when the unpaired piston belongs to the front bank with respect to the rotating direction of the crankshaft or (180−θ)° ahead of the common crankpins with respect to the rotating direction of the crankshaft when the unpaired piston belongs to the rear bank with respect to the rotating direction of the crankshaft, and reciprocating parts including the pistons, associated with all the cylinders, respectively, have the same mass, and the crankshaft is provided with balance weight which generates a balancing force of $kMr\omega^2$ acting in a sense of $(\alpha+180)°$, where:

$$k = \sqrt{\left(\frac{1}{2}\sqrt{1-\frac{1}{4n^2}}\right)^2 + \left(n - \frac{1}{4n}\right)^2}$$

$$\alpha = \sin^{-1}\left(\frac{\frac{1}{2}\sqrt{1-\frac{1}{4n^2}}}{k}\right)$$

α: Angle from the common crankpins in the rotating direction
M: Mass of each reciprocating part
r: Crank throw and
ω: Angular velocity of the crankshaft.

2. The odd-cylinder V-type internal combustion engine according to claim 1, wherein the balance weight includes a plurality of balance weights, attributes of the balance weights are such that a balance ratio for the reciprocating parts including each piston, is 50%, and each balance weight is disposed diametrically opposite to the corresponding crankpin with respect to the axis of rotation of the crankshaft.

3. The odd-cylinder V-type internal combustion engine according to claim 1, wherein n represents an even number, the balance weight includes a plurality of balance weights, the odd crankpin is disposed at a position corresponding to a middle part of the crankshaft with respect to directions parallel to the axis of rotation of the crankshaft, and the reciprocating parts including all the pistons, and all the balance weights are arranged symmetrically with respect to an imaginary plane including the center axis of the cylinder bore in which the unpaired piston is fitted and perpendicular to the axis of rotation of the crankshaft.

* * * * *

UNITED STATES PATENT AND TRADEMARK OFFICE
CERTIFICATE OF CORRECTION

PATENT NO.   : 6,745,730 B2
DATED        : June 8, 2004
INVENTOR(S)  : Noboru Yamashita It is certified that error appears in the above-identified patent and that said Letters Patent is hereby corrected as shown below:

Title page,
Item [57], ABSTRACT,
Line 4, between "common crankpins" and "each connected" delete "$(K_c)$";
Line 5, before "two paired" delete "the"; between "two paired" and "pistons respectively" insert -- ones of the --;
Line 6, between "odd crankpin" and "connected to" delete "$(K_s)$";
Line 7, between "common crankpins" and "are disposed" delete "$(K_c)$";
Line 9, between "odd crankpin" and "is disposed" delete "$(K_s)$";
Line 10, between "crank pins" and "with respect" delete "$(K_c)$";
Line 15, at the end of the line after "balance weight" delete "means".

Column 7,
Line 67, at the end of the line after "(5)" insert a period.

Column 8,
Line 55, change " $k = \sqrt{\left(\frac{1}{2}\sqrt{1-\frac{1}{4n^2}}\right)^2 + (n-\frac{1}{4n})^2}$ " to -- $k = \sqrt{\left(\frac{1}{2}\sqrt{1-\frac{1}{4n^2}}\right)^2 + (n-\frac{1}{4n})^2}$ --.

Column 9,
Line 40, at the end of the line after "(17)" insert a period.

Column 12,
Line 63, between "acting" and "the reciprocating" change "o" to -- on --.

Column 13,
Line 10, between "to stabilize" and "riding position" insert -- a --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,745,730 B2  Page 1 of 2
APPLICATION NO. : 10/204255
DATED : June 8, 2004
INVENTOR(S) : Yamashita It is certified that error appears in the above-identified patent and that said Letters Patent is hereby corrected as shown below:

Title page:
    In section (57), the "ABSTRACT":
        1st line, change "engine includ-" to --engine, includ- --;
        3rd line, change "cylinders has" to --cylinders, has--;
        4th line, delete "($K_C$)";
        5th line, change "the two paired pistons" to --two paired ones of the pistons--;
        6th line, delete "($K_S$)";
        7th line, delete "($K_C$)";
        9th line, delete "($K_S$)";
        10th line, delete "($K_C$)";
        15th line, change "balance weight means" to --balance weight--.

Column 1:
    Line 57, change "one of odd cylinders" to --one of the odd cylinders--.

Column 3:
    Line 18, change "n represents an even" to --n represents a natural--.
    Line 31, change "balance weights, the primary" to --balance weights. The primary--.
    Line 32, change "reciprocating part including, and" to --reciprocating part, and--.
    Line 33, change "weight are symmetrical" to --weight, are symmetrical--.

Column 4:
    Line 45, change "main flames" to --main frames--.
    Line 61, change "to a lower parts" to --to lower parts--.

Column 8:
    Line 41, in Equation (10), change "$n\cos\tau + n\cos(\tau - \theta)\cos\theta + \cos\tau\cos\theta$" to
--$n\cos\tau + n\cos(\tau - \theta)\cos\theta - \cos\tau\cos\theta$--.
    Lines 53-54, in Equation (12), change " $\frac{1}{2}$ " to -- $\frac{1}{2}$ --.

Signed and Sealed this

Twenty-ninth Day of June, 2010

David J. Kappos
*Director of the United States Patent and Trademark Office*

CERTIFICATE OF CORRECTION (continued)
U.S. Pat. No. 6,745,730 B2

Column 11:
    Line 28, change "a sense parallel the" to --a sense parallel to the--.

Column 12:
    Line 12, change "crankshaft 5 prevents" to --crankshaft 5 prevent--.
    Line 63, change "acting o the" to --acting on the--.

Column 14:
    Line 49, change "n represents an even" to --n represents a natural--.